E. H. SMITH.
REVERSIBLE SEAT FOR WHEELED PLOWS.
APPLICATION FILED JAN. 21, 1915.

1,158,867.

Patented Nov. 2, 1915.

Witnesses
Fenton S. Belt
J. W. Sherwood

Inventor
E. H. Smith
By Franklin N. Hough
Attorney

COLUMBIA PLANOGRAPH CO., WASHINGTON, D. C.

UNITED STATES PATENT OFFICE.

EDMUND HARVEY SMITH, OF BRANDYWINE SUMMIT, PENNSYLVANIA.

REVERSIBLE SEAT FOR WHEELED PLOWS.

1,158,867.  Specification of Letters Patent.  Patented Nov. 2, 1915.

Application filed January 21, 1915. Serial No. 3,615.

*To all whom it may concern:*

Be it known that I, EDMUND HARVEY SMITH, a citizen of the United States, residing at Brandywine Summit, in the county of Delaware and State of Pennsylvania, have invented certain new and useful Improvements in Reversible Seats for Wheeled Plows, &c.; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in seats for use upon side hill wheeled plows, cultivators and other agricultural implements and it has for its object the provision of a reversible seat which will permit the operator to transfer the seat so as to occupy at all times a position upon the uphill side of the machine.

To these ends and to such others as the invention may pertain, the same consists in the novel form of the seat and the means whereby the same is attached to the plow or cultivator, all as will be more fully hereinafter described, shown in the accompanying drawings and then specifically defined in the appended claim.

The invention is clearly illustrated in the accompanying drawings which, with the letters of reference marked thereon, form a part of this specification and in which:—

Figure 1:
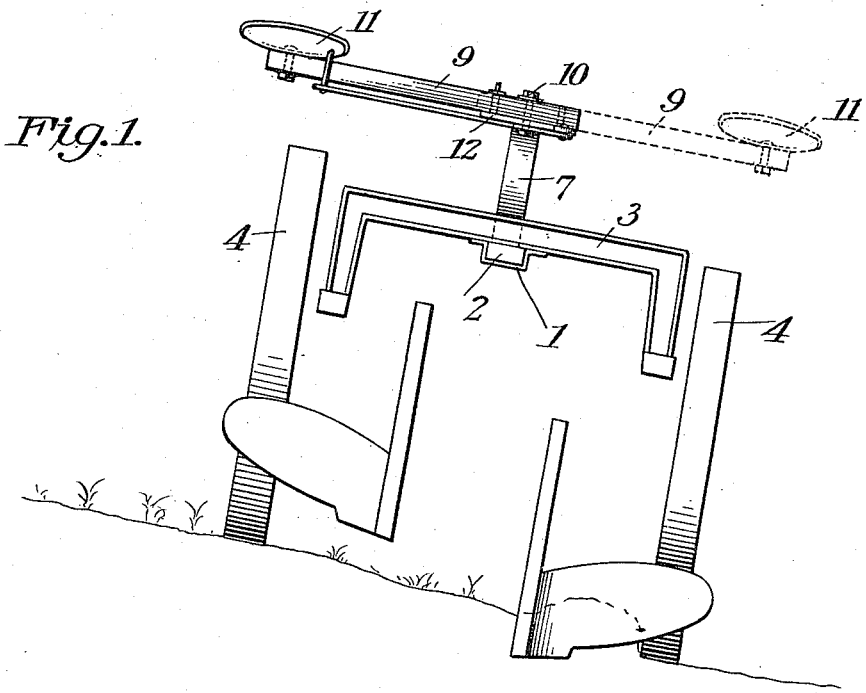
Figure 2:
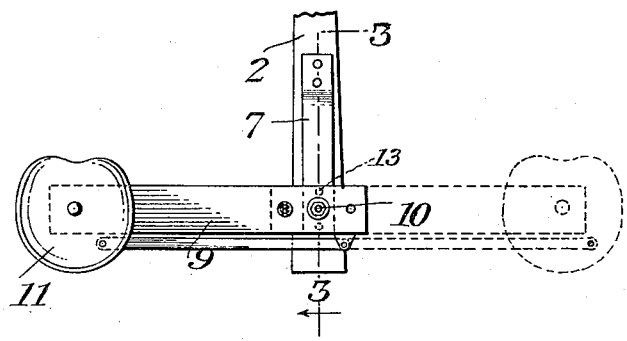
Figure 3:
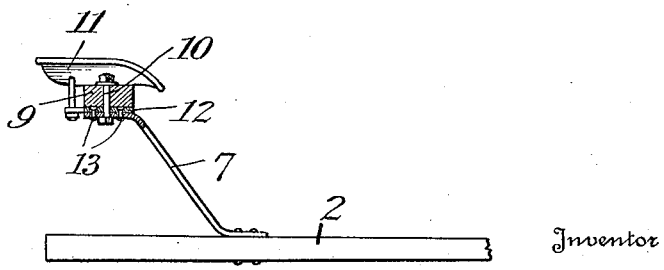

Figure 1 is a view of the rear end of a wheeled side hill plow, the seat being shown positioned upon the hill side of the plow. Fig. 2 is a plan view of the seat supporting member. Fig. 3 is a sectional view taken on line 3—3 of Fig. 2.

Reference now being had to the details of the drawings by numeral, 3 designates the axle of a side hill plow upon which the wheels 4 are mounted, and 2 is a tongue which is held to the axle by means of the bracket member 1 and upon which tongue the spring 7 is securely bolted at one end, the upper end of the spring being apertured for the reception of the bolt 10. A plate 12 is secured to said spring by means of the bolts 13 and through which plate the bolt 10 passes. A seat supporting member 9 is pivotally mounted upon the bolt 10 and carries the seat 11 at its outer end.

It will be noted by this construction that the end of the seat supporting member to which the seat is secured can be turned so that the operator can be positioned at all times upon the uphill side of the machine. When the end of the furrow is reached and the machine is reversed, it is simply necessary to turn the seat supporting member upon its pivot when the weight of the rider will be transferred to the opposite side of the machine.

What I claim to be new is:—

In combination with the axle of a wheeled plow having a tongue secured thereto, a spring fastened at one end to said tongue and its other end bent horizontally and apertured, a plate secured to said horizontally disposed portion of the spring, a pivotal bolt passing through the spring and plate and projecting above the latter, a swinging seat supporting member mounted upon the projecting portion of said bolt, and a seat upon said member.

In testimony whereof I hereunto affix my signature in presence of two witnesses.

EDMUND HARVEY SMITH.

Witnesses:
LAWRENCE J. BROMAN,
WM. M. CONNELLY.

Copies of this patent may be obtained for five cents each, by addressing the "Commissioner of Patents, Washington, D. C."